Jan. 28, 1969 H. R. DI VETO 3,424,391

FREE-POSITIONING ALIGNMENT BOBBIN

Filed Feb. 23, 1967

INVENTOR.
HILLIARD R. DiVETO
BY Russel C. Wells
ATTORNEY.

United States Patent Office 3,424,391

Patented Jan. 28, 1969

3,424,391

FREE-POSITIONING ALIGNMENT BOBBIN

Hilliard R. Di Veto, Plymouth, Mich., assignor to Burroughs Corporation, Detroit, Mich., a corporation of Michigan Filed Feb. 23, 1967, Ser. No. 617,942

U.S. Cl. 242—55.12 8 Claims

Int. Cl. G01b *15/44;* B65h *27/00, 49/00*

ABSTRACT OF THE DISCLOSURE

The invention disclosed herein is a magnetic tape guiding apparatus having a freely positioning bobbin which is positioned by the conformation and tracking of the tape. Although the bobbin can be positioned in two degrees of freedom, it precisely constrains the tape against a lateral shift relative to the direction of tape travel. The bobbin is further mounted on an arm pivoted and resiliently biased to keep the tape under a constant controlled tension at all times.

*Summary of invention*

This invention relates to web transport systems in general and to web transport guides in particular.

In magnetic tape readers, previous tape guiding devices have had to be fabricated very accurately to close tolerances and exacting dimensions which resulted in high manufacturing costs. This was necessary because in magnetic tape transport systems, the magnetic tape must be guided accurately and positively from the tape storage reel past the recording and reading station to the tape take-up reel. Also the tape must not be damaged in handling because in a computer system, for instance, the magnetic tape carries many words of information and of program and must be reused many times. My invention achieves all of the previously mentioned requirements but without the attendant high manufacturing cost.

It is, therefore, an object of this invention to improve the guide means for tape transport systems at a considerable manufacturing cost savings over prior guides.

Another object is to simplify the loading of magnetic tape from its storage reel to its take-up reel by providing tape guides which are freely positioned in the attitude which the tape may dictate by its tracking.

The invention, both as to its organization and method of operation, together with further objects and advantages thereof, will best be understood by reference to the following detailed description taken in connection with the accompanying drawings, in which.

*Detailed description*

Figure 1:
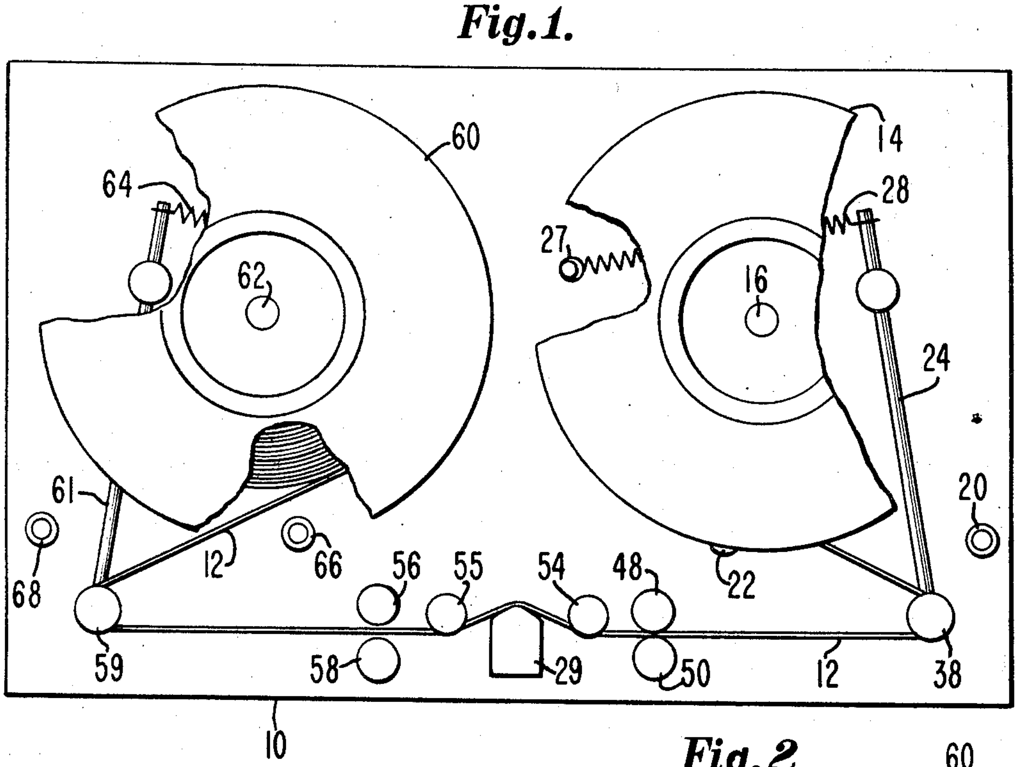
FIG. 1 is a plan view of a magnetic tape transport deck embodying features of the invention.

Referring to the figures and characters of reference and in particular to FIG. 1, a magnetic tape system is shown mounted to base plate 10. The magnetic tape 12 is stored on a reel 14 which is secured to drive shaft 16.

The drive shaft 16 is journaled in the base plate 10 and may be an extension of the armature shaft of the motor 18 which is mounted beneath the base plate 10. It is preferred to drive a magnetic tape reel with its own power source, although other drive means such as belt or gear mechanisms would be acceptable and, if used, would not depart from the spirit of the invention.

Figures 2, 3:
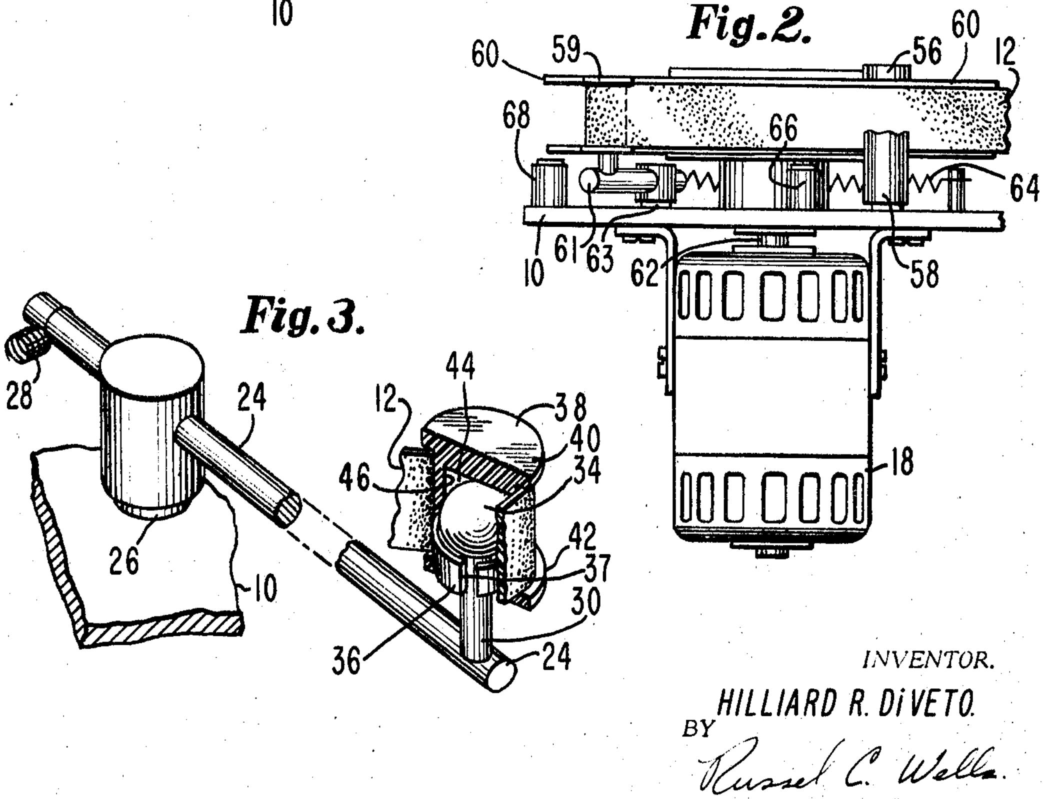
FIG. 2 is a fragmentary front view of the device of FIG. 1.
FIG. 3 is a fragmentary perspective view.

A tape storage arm 24 is pivotally mounted adjacent to the drive shaft 16 and parallel to the base plate 10. The arcual motion of the tape storage arm 24 is limited by a pair of bumpers 20, 22, which are securely mounted to the base plate 10. The tape storage arm 24 is carried by post 26, as shown in FIG. 3, which is securely mounted to base plate 10. The arm 24 has means for attaching a spring 28 at the end nearest the post 26. This spring 28, which is secured to the base plate 10 by a post 27, biases the tape storage arm 24 in a direction away from the read-write unit 29, thereby keeping a constant tension on the magnetic tape 12 for better tape feed control and for controlling the amount of pressure of the magnetic tape 12 against the read-write unit 29.

The other end of the tape storage arm 24, in the preferred embodiment, is fabricated in an upturned portion 30 which is normal to the main body of the tape storage arm 24. This upturned portion 30 may have its end reduced in cross section from that of the main body of the tape storage arm 24. The cross section of the tape storage arm 24 may be cylindrical in shape as shown, but this is not a requirement of my invention.

Attached to the end of the upturned portion 30 is a spherical member 34 such as a ball or globe. The spherical member 34 is fabricated from a material having such particular properties as: smooth surface finish, low frictional characteristics, and non-magnetic characteristics. In the preferred embodiment, I have used a non-magnetic stainless steel which is only one of many materials which have the aforementioned properties.

Loosely mounted around the upturned portion 30 of the tape storage arm 24 and also not freely removable therefrom, is a cylindrical ring 36 having a split 37 along one side. The ring 36 has an inside diameter large than the upturned portion 30 of the tape storage arm 24 but smaller than the diameter of the spherical member 34.

Mounted on the spherical member 34 is the free-positioning tape guide bobbin 38. The bobbin 38 is fabricated from a nylon or Teflon material because of their almost frictionless somewhat "self-lubricating" property and because of their non-magnetic qualities. The bobbin is cylindrical in shape having an upper rim 40 and a lower rim 42. The distance between the two rims 40 and 42 is somewhat greater than the width of the magnetic tape which is to be used in the tape system. The functions of the two rims 40 and 42 are to protect the magnetic tape 12 from damage and also to retain the magnetic tape 12 on the bobbin 38. The interior of the bobbin 38 forms a cylindrical cavity 44. The diameter of the cavity 44 is such as to allow a running fit between the walls of the cavity 44 and the outside diameter of the spherical member 34. The guide bobbin 38 pivots around the spherical member 34 at a fulcrum point on the lateral surface 46 of the cavity 44.

After slidably mounting the guide bobbin 38 on the spherical member 34, the previously described split ring 36 is compressed and inserted into the cavity 44 of the bobbin 38. Once the ring 36 is inserted into the cavity 44, the compression force on the ring 36 is released, allowing it to expand against the wall of the cavity 44 to form a press fit, thereby retaining the bobbin 38 around the spherical member 34. The height of the split ring 36 governs the amount of axial movement of the guide bobbin 38 as is determined by the tracking of the magnetic tape 12. If the ring 36 is positioned close to the spherical member 34, the guide bobbin 38 will not have as much axial movement as it would have if the ring 36 is positioned further away from the spherical member.

The magnetic tape 12 is fed from the magnetic tape storage reel 14 around the guide bobbin 38 and then between a pair of rollers 48 and 50. Roller 48 is a capstan drive roller which controls the speed of the magnetic tape 12 as it passes around the read-write unit 29. Roller 50 is a pressure roller which presses the magnetic tape 12 against the capstan drive roller 48 when the tape is to be fed.

Guides 54 and 55 are a pair of fixed cylindrical spools mounted to the base plate 10. The spool construction of these guides 54 and 55 accurately aligns the magnetic tape 12 to the read-write unit 29. The physical placement of these guides, 54 and 55, relative to the read-write unit 29 insures a sufficient amount of wrap of the magnetic tape 12 around the read-write unit 29. This wrapping insures a better reading signal output from the tape and a better quality of writing on the tape.

After leaving the read-write area 29, the magnetic tape is passed between a pair of cylindrical rollers 56 and 58. These rollers, 56 and 58, are not in physical contact with the magnetic tape 12 unless a command is received from a control unit such as a central processor, which is not shown, to stop the magnetic tape travel. Under control of such a command, the two rollers 56 and 58 are pressed against each other on opposite sides of the magnetic tape 12 thereby arresting the travel of the tape.

From the rollers 56 and 58, the magnetic tape 12 passes around another tape guide bobbin 59 which is mounted on the arm 61 in the same manner as the bobbin 38 is mounted on tape storage arm 24 as has been hereinbefore described. The arm 61 is pivotally mounted on the post 63 which is mounted in the base plate 10. The arcuate motion of the arm 61 is also limited by a pair of bumpers 66, 68, in the same manner as has been described for the tape storage arm 24. The tape is then rewound around the take-up reel 60 which is mounted on the shaft 62 and is driven by a power source similar to motor 18.

As can be observed, if the tape is unreeled from a relatively full reel and found on a relatively empty reel, the power source must drive the empty or take-up reel at a greater speed than the rotational speed of the full reel. To take up the resulting increase of tape length due to the speed differential and to control the tightness of the wind on the take-up reel, springs 28 and 64 bias the arms 24 and 61 in a direction away from the rolls 48, 50, 56, and 58 thereby keeping the tape 12 under a controlled tension at all times.

I have thus described a preferred embodiment of a magnetic tape guiding apparatus in which the guide is mounted to allow movement in three degrees; namely, rotational, axial, and canting but precisely constraining movement in a fourth degree; namely, one of lateral displacement relative to its mounting. The guide is then mounted on a controlled tension arm which keeps the tape under a constant reeling tension regardless of the amount of tape on the reels, the speed of motor driving the reels, or the length of the tape path.

While I have shown and described in detail the particular method of construction of the present invention in its preferred embodiment, it is to be understood that the invention is not limited thereby but is limited only by scope and breath of the appended claims.

I claim:

1. A tape guiding apparatus for use on a magnetic tape unit having a base plate, means for mounting magnetic tape storage and take-up reels and means for reading said tape, said apparatus comprising an arm substantially parallel to said base and pivotally mounted thereon, one end of said arm upturned away from said base, a spherical member mounted to said upturned portion of said arm, a bobbin having an enclosed axial cavity extending from one end receiving said spherical member, means retaining said bobbin on said spherical member and allowing said bobbin to be freely positioned in two degrees of freedom, and resilient means attached to said arm acting to bias said arm in one direction to thereby control the tension of said tape.

2. The apparatus of claim 1 wherein said bobbin has a smooth finished surface intermediate its ends, said surface adapted for guiding said tape.

3. The apparatus of claim 1 wherein said means retaining said bobbin is a ring cylindrically shaped, having a gap in its surface parallel to its axis and said ring being loosely mounted on said arm locating the cavity of said bobbin on said spherical member and allowing said bobbin to be freely positioned in conformity with the tracking of said tape.

4. A free-positioning magnetic tape guide apparatus comprising a shaft, a non-magnetic ball mounted on the end of said shaft, a bobbin adapted to guide said magnetic tape, said bobbin having a partially enclosed cylindrical axial cavity in one end thereof of substantially the same diameter as said ball to contain said ball and an expansion ring having an inner diameter smaller than the diameter of said ball and loosely mounted on said shaft and said ring being moveable into said cavity for retaining said bobbin on said ball allowing said bobbin three degrees of motion in conformity with the tracking of said tape.

5. A free-positioning bobbin apparatus comprising:

a cylindrical bobbin having a circumferential rim at each end, a smooth surface intermediate said rims adapted to guide a web and an enclosed cylindrical cavity along the rotational axis of said bobbin opening to one end of said bobbin, an upturned arm having a spherical end which end is substantially the size of said cavity extending into said cavity, a fulcrum lying on the lateral surface of said cavity about which fulcrum the bobbin is pivotal around the spherical end, and a split-ring member loosely encircling said upturned arm and operatively connected to said bobbin retaining said spherical end in operative contact with said fulcrum allowing said bobbin to be freely positioned in conformity with the tracking of said web.

6. The apparatus according to claim 1 wherein the resilient means is a tension spring mounted to said base and attached to said arm acting to bias said arm in one direction to thereby control the tension of said tape.

7. The apparatus according to claim 2 wherein said bobbin further includes an upright circumferential rim at each end to retain the tape on the bobbin.

8. The apparatus according to claim 2 wherein the bobbin is fabricated from a substantially frictionless nonmagnetic material.

References Cited

UNITED STATES PATENTS

| | | | |
|---|---|---|---|
| 2,194,879 | 3/1940 | Von Mihaly et al. | 242—76 |
| 2,893,653 | 7/1959 | Schultheis et al. | 242—155.12 |
| 2,989,265 | 6/1961 | Selsted | 242—76 |

LEONARD D. CHRISTIAN, *Primary Examiner.*

U.S. Cl. X.R.

242—76